United States Patent
Caron

(10) Patent No.: US 11,559,832 B2
(45) Date of Patent: Jan. 24, 2023

(54) CYLINDRICAL TUBE FORMATION

(71) Applicant: Keystone Tower Systems, Inc., Denver, CO (US)

(72) Inventor: Michel Caron, Superior, CO (US)

(73) Assignee: Keystone Tower Systems, Inc., Denver, CO (US)

( * ) Notice: Subject to any disclaimer, the term of this patent is extended or adjusted under 35 U.S.C. 154(b) by 388 days.

(21) Appl. No.: 16/915,008

(22) Filed: Jun. 29, 2020

(65) Prior Publication Data

US 2020/0324329 A1    Oct. 15, 2020

Related U.S. Application Data

(63) Continuation of application No. 16/190,603, filed on Nov. 14, 2018, now Pat. No. 10,717,122, which is a
(Continued)

(51) Int. Cl.
*B23K 31/02* (2006.01)
*B21C 37/12* (2006.01)
(Continued)

(52) U.S. Cl.
CPC ............. *B21C 37/122* (2013.01); *B21B 1/22* (2013.01); *B21C 37/126* (2013.01);
(Continued)

(58) Field of Classification Search
CPC ....... B21C 37/122; B21C 37/06; B21C 37/12; B21C 37/127; B21C 37/126; B21C 37/26; B21C 37/156; B23K 9/0325
See application file for complete search history.

(56) References Cited

U.S. PATENT DOCUMENTS

RE23,899 E  * 11/1954 Robinson .................. B31C 3/00
                                                                156/190
3,155,063 A * 11/1964 Malkki .................... B21C 37/12
                                                                72/50
(Continued)

FOREIGN PATENT DOCUMENTS

CN       201475627 U      5/2010
CN       201613273 U     10/2010
(Continued)

OTHER PUBLICATIONS

WIPO, PCT Application No. PCT/US18/13630, International Preliminary Report on Patentability dated Jul. 16, 2019, 4 pages.
(Continued)

*Primary Examiner* — Jason L Vaughan
*Assistant Examiner* — Amanda Kreiling
(74) *Attorney, Agent, or Firm* — The Marbury Law Group, PLLC

(57) ABSTRACT

Tube forming methods can be used for efficient transition in the production of tubes having varying thickness. Material used to form consecutive tubes may have the same thickness along a separation plane separating a first discrete section from a second discrete section of the material, and the first discrete section and the second discrete section may each have varying thickness in a feed direction of the material. With such a thickness profile, the first discrete section of the material may be formed into a first cylinder having varying thickness and separated from the second discrete portion as the second discrete section is formed into a second cylinder having varying thickness. In particular, the transition between the first cylinder and the second cylinder may be achieved without scrap and/or interruption, resulting in cost-savings and improvements in production throughput associated with forming tubes having varying thickness.

18 Claims, 8 Drawing Sheets

Related U.S. Application Data continuation of application No. 15/870,612, filed on Jan. 12, 2018, now Pat. No. 10,150,150.

(60) Provisional application No. 62/445,520, filed on Jan. 12, 2017.

(51) Int. Cl.
  *B21C 37/26* (2006.01)
  *B23K 9/032* (2006.01)
  *B21C 37/15* (2006.01)
  *B23K 26/302* (2014.01)
  *F16L 9/16* (2006.01)
  *B21B 1/22* (2006.01)
  *B23P 13/02* (2006.01)
  *B23P 15/02* (2006.01)

(52) U.S. Cl.
  CPC ............ *B21C 37/156* (2013.01); *B21C 37/26* (2013.01); *B23K 9/0325* (2013.01); *B23K 26/302* (2015.10); *B23K 31/027* (2013.01); *B23P 13/02* (2013.01); *B23P 15/02* (2013.01); *F16L 9/165* (2013.01); *Y02E 10/728* (2013.01)

(56) References Cited

U.S. PATENT DOCUMENTS

| | | | | |
|---|---|---|---|---|
| 3,240,042 | A | * | 3/1966 | Habdas ................. B21C 37/12 138/154 |
| 3,775,835 | A | * | 12/1973 | Cauffiel ............... B21C 37/185 138/156 |
| 3,845,645 | A | * | 11/1974 | Gebauer ............... B21C 37/126 72/170 |
| 3,997,097 | A | | 12/1976 | Embury et al. |
| 4,082,211 | A | * | 4/1978 | Embury ................. B23K 5/086 228/145 |
| 4,706,481 | A | | 11/1987 | Castricum |
| 4,838,317 | A | | 6/1989 | Andre et al. |
| 8,941,023 | B2 | | 1/2015 | Holste et al. |
| 8,991,439 | B2 | | 3/2015 | Twist |
| 2006/0112558 | A1 | | 6/2006 | Lorenz et al. |
| 2006/0151045 | A1 | | 7/2006 | Johnston |
| 2010/0095508 | A1 | | 4/2010 | Wahlen et al. |
| 2012/0273556 | A1 | * | 11/2012 | Unan ..................... B21C 47/02 228/154 |
| 2014/0047696 | A1 | * | 2/2014 | Unan .................... B21C 37/122 72/66 |
| 2016/0375476 | A1 | | 12/2016 | Smith et al. |
| 2018/0193893 | A1 | | 7/2018 | Caron |

FOREIGN PATENT DOCUMENTS

| | | |
|---|---|---|
| CN | 102284550 A | 12/2011 |
| DE | 1134465 B | 8/1962 |
| WO | 2018132744 A1 | 7/2018 |

OTHER PUBLICATIONS

ISA, PCT Application No. PCT/US18/13630, International Search Report and Written Opinion dated Mar. 9, 2018, 5 pages.
USPTO, U.S. Appl. No. 15/870,612, Notice of Allowance dated Aug. 10, 2018, 11 pages.
EPO, Extended European Search Report, PCT/US2018/013630, dated Jul. 21, 2020. 5 pages.
Chinese Application No. 201880018171.3, First Office Action and Search Report, dated Aug. 10, 2020. 11 pages.
USPTO, U.S. Appl. No. 16/190,603, Notice of Allowance dated Mar. 23, 2020, 7 pages.
USPTO, U.S. Appl. No. 16/190,603, Non-Final Office Action dated Nov. 29, 2019, 14 pages.

* cited by examiner

CYLINDRICAL TUBE FORMATION

CROSS-REFERENCE TO RELATED APPLICATIONS

This application is a continuation of U.S. patent application Ser. No. 16/190,603, filed Nov. 14, 2018, which is a continuation of U.S. patent application Ser. No. 15/870,612 (now U.S. Pat. No. 10,150,150), filed Jan. 12, 2018, which claims the benefit of U.S. Provisional Patent Application No. 62/445,520, filed on Jan. 12, 2017, with the entire contents of each of these applications hereby incorporated herein by reference.

BACKGROUND

Tubes are ubiquitous in industrial applications, with some common uses including supporting wind turbines (or other machinery) and transporting fluid. It is often desirable to vary thickness of one or more tubes formed for a particular application. For example, in large-scale industrial applications, such as formation of wind turbine towers, tubes used to form such towers are built in a factory setting and are limited to a maximum diameter constrained by transportation restrictions. With diameter of the tube constrained in this way, it is often desirable to vary wall thickness of the tube along the length of the tube to form the tube with desired structural performance characteristics. In particular, it is often desirable for the wall thickness to gradually increase along one direction in the tube (e.g., to accommodate the increasing moment loading along the axis of the tube, so that the thickness at one end of the tube is substantially greater than the thickness at the other end of the tube).

Variation of thickness of tubes, however, creates certain challenges with respect to efficient use of material and throughput in production processes used to form these tubes. As an example, transitions in thickness from one tube to the next may produce scrap, for example, when the change in thickness is too large to be accommodated by a continuous production process. This may occur, for example, at the transition between two instances of the same tube with gradually increasing wall thickness, with the first end having a substantially greater thickness than the second end. Further, if the tube is being formed using a continuous production process, the process may need to pause for the thickness change to be accommodated. For example, before the next tube can be formed, the scrap must be removed and additional steps taken to re-start the process. Production of scrap and slowing or pausing the continuous production process can both add significantly to the cost of a tube. Thus, there remains a need for improved methods of producing tubes having longitudinal variations in thickness.

SUMMARY

Tube forming methods can be used for efficient transition in the production of tubes having varying thickness. Material used to form consecutive tubes may have the same thickness along a separation plane separating a first discrete section from a second discrete section of the material, and the first discrete section and the second discrete section may each have varying thickness in a feed direction of the material. With such a thickness profile, the first discrete section of the material may be formed into a first cylinder having varying thickness and separated from the second discrete section as the second discrete section is formed into a second cylinder having varying thickness. In particular, the transition between the first cylinder and the second cylinder may be achieved without scrap and/or interruption, resulting in cost-savings and improvements in production throughput associated with forming tubes having varying thickness.

According to one aspect, a method of forming a tube may include moving a material in a feed direction into a curving device, the material having a first discrete section abutting a second discrete section along a separation plane intersecting the material, the first discrete section and the second discrete section having the same thickness at the separation plane and each having a varying thickness in the feed direction, as the material intersected by the separation plane moves through the curving device, forming the material into a first cylinder having a spiral seam intersected by the separation plane, joining the first discrete section to itself and to the second discrete section along the spiral seam, and severing the first discrete section from the second discrete section along the separation plane intersecting the spiral seam along a position at which the first discrete section is joined to the second discrete section.

In certain implementations, the material may be continuously moved in the feed direction.

In some implementations, forming the material into the first cylinder may include bending a first edge of the first discrete section adjacent to a second edge of the second discrete section at the intersection of the separation plane and the spiral seam.

In certain implementations, the separation plane may be perpendicular to a longitudinal axis defined by the first cylinder.

In some implementations, the material may include a plurality of sheets secured to one another in a direction intersecting the feed direction. For example, the separation plane may substantially bisect one sheet of the plurality of sheets. In certain instances, the substantially bisected sheet may be longer than at least one adjacent sheet in the plurality of sheets. Further, or instead, joining the first discrete section to itself and to the second discrete section may include forming corner seams of the material along the spiral seam. The separation plane may intersect the spiral seam along a portion of the spiral seam spaced apart from the corner seams.

In certain implementations, the first discrete section may be severed from the second discrete section as a segment of the second discrete section is in the curving device.

In some implementations, the method may further include forming the second discrete section into the second cylinder. For example, a leading edge of the second cylinder may be bounded by the separation plane along which the first discrete section is severed from the second discrete section.

In certain implementations, at least a portion of the first discrete section may have a monotonically changing thickness along the feed direction, and at least a portion of the second discrete section may have a monotonically changing thickness along the feed direction. The thickness of one of the at least one portion of the first discrete section and the at least one portion of the second discrete section may increase in the feed direction, and the thickness of the other one of the at least one portion of the first discrete section and the at least one portion of the second discrete may decrease in the feed direction. Further or instead, a variation in the thickness of the first discrete section may be symmetrically mirrored by a variation in the thickness of the second discrete section about the separation plane.

In some implementations, the material moved into the curving device is a planar strip of metal. Further or instead, the curving device may include a plurality of roll banks arranged as a triple roll.

In certain implementations, joining the first discrete section to itself and to the second discrete section along the spiral seam may include continuously welding the material.

In some implementations, severing the first discrete section from the second discrete section may include cutting along an entire circumference of the first cylinder.

In certain implementations the first cylinder may be undeformed as the first discrete section is severed from the second discrete section.

Other aspects, features, and advantages will be apparent from the description and drawings, and from the claims.

BRIEF DESCRIPTION OF THE FIGURES

Like reference symbols in the various drawings indicate like elements.

DETAILED DESCRIPTION

Figure 1:
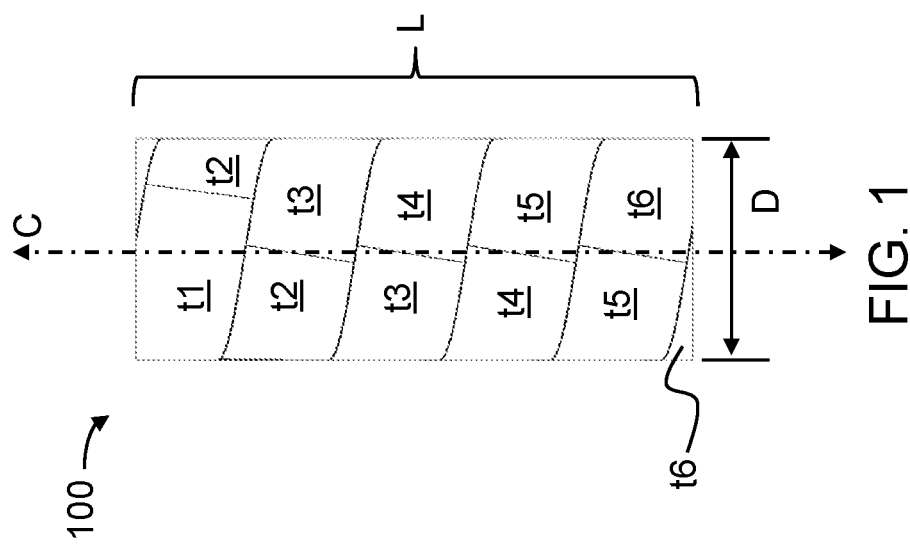
FIG. 1 is a side view of a cylindrical tube having a longitudinal variation in thickness.

Embodiments will now be described more fully hereinafter with reference to the accompanying figures. The foregoing may, however, be embodied in many different forms and should not be construed as limited to the illustrated embodiments set forth herein.

All documents mentioned herein are hereby incorporated by reference in their entirety. References to items in the singular should be understood to include items in the plural, and vice versa, unless explicitly stated otherwise or clear from the context. Grammatical conjunctions are intended to express any and all disjunctive and conjunctive combinations of conjoined clauses, sentences, words, and the like, unless otherwise stated or clear from the context. Thus, the term "or" should generally be understood to mean "and/or" and, similarly, the term "and" should generally be understood to mean "and/or."

Recitation of ranges of values herein are not intended to be limiting, referring instead individually to any and all values falling within the range, unless otherwise indicated herein, and each separate value within such a range is incorporated into the specification as if it were individually recited herein. The words "about," "approximately," "substantially" or the like, when accompanying a numerical value, are to be construed as including any deviation as would be appreciated by one of ordinary skill in the art to operate satisfactorily for an intended purpose. Ranges of values and/or numeric values are provided herein as examples only, and do not constitute a limitation on the scope of the described embodiments. The use of any and all examples or exemplary language ("e.g.," "such as," or the like) provided herein, is intended merely to better illuminate the embodiments and does not pose a limitation on the scope of the embodiments or the claims. No language in the specification should be construed as indicating any unclaimed element as essential to the practice of the disclosed embodiments.

In the following description, it is understood that terms such as "first," "second," "top," "bottom," "above," "below," "up," "down," and the like, to the extent used herein, are words of convenience and are not to be construed as limiting terms unless specifically stated.

Forming processes of the present disclosure are described with respect to formation of tubes useful for any one or more of a variety of industrial applications. For example, the tubes formed herein may be mounted with flanges and coupled to one another and, optionally, to other types of tubes to form a continuous hollow structure, such as may be useful for forming at least a portion of wind towers, pilings, other structural pieces for civil engineers (e.g., columns), pipelines, ducting, and the like. Thus, as a more specific example and unless otherwise specified or made clear from the context, the tubes formed according to the devices, systems, and methods described herein should be understood to be useful as sections of towers used to support wind turbines or other similar machinery. However, this is by way of example and should not be understood to limit the present disclosure in any way.

As used herein, the terms tube and cylinder shall be used interchangeably, unless otherwise specified or made clear from the context. More specifically, in the context of the present disclosure, tube and cylinder shall be understood to include a shape that is substantially a right circular cylinder, allowing for dimensional variations in accordance with dimensional tolerances of the structure being formed. Further, or instead, tubes and cylinders of the present disclosure shall be understood to be hollow along a longitudinal axis of the substantially right circular cylinder shape.

Further, as used herein, the term thickness shall refer to wall thickness of a sheet of material in planar form or in a curved form, as the case may be, according to the context. In a tube or cylinder that has been formed or is in the process of being formed, then, thickness shall be understood to be a radial dimension of material of the respective tube or cylinder at a given longitudinal position along the tube or cylinder. Thus, for example, a tube or cylinder having a longitudinal variation in thickness shall be understood to have a wall thickness that varies at least in a longitudinal direction along the tube or cylinder.

Referring to FIG. 1, a cylinder 100 having a length "L" and a diameter "D" may be formed of sheets t1, t2, t3, t4, t5, t6. Each sheet t1, t2, t3, t4, t5, t6 may have a respective thickness (e.g., a substantially uniform thickness). The respective thickness of at least one of the sheets t1, t2, t3, t4, t5, t6 may be different from the respective thickness of at least another one of the sheets t1, t2, t3, t4, t5, t6 such that, collectively, the sheets t1, t2, t3, t4, t5, t6 impart a variation in thickness along a longitudinal axis "C" defined by the cylinder 100. That is, in a longitudinal direction from t1 to t6, thickness of the cylinder 100 may vary according to any one or more patterns and along all or a portion of the length "L" of the cylinder 100. Thus, for example, the cylinder 100 may have a monotonically increasing or decreasing thickness along at least a portion of the length "L" of the cylinder 100 in a direction from t1 to t6. Variation in thickness of the cylinder 100 may be useful for achieving, for example, target structural performance characteristics for the cylinder 100 dimensionally constrained to a specific value or range of values of the diameter "D." Further, or instead, as compared to forming the cylinder 100 with a material of uniform thickness selected based on meeting the most stringent structural requirement along a portion of the cylinder 100 and over-dimensioned for structural requirements along other portions of the cylinder 100, forming the cylinder 100 with a variation in thickness along the sheets t1, t2, t3, t4, t5, t6 may have significant advantages with respect to weight and cost savings. Still further, or instead, and as described in greater detail below, the cylinder 100 may be formed according to one or more processes that may facilitate achieving additional efficiency in the use of material (e.g., cost savings) and, in certain instances, increases in throughput of a fabrication system used to form the cylinder 100.

Figure 2:
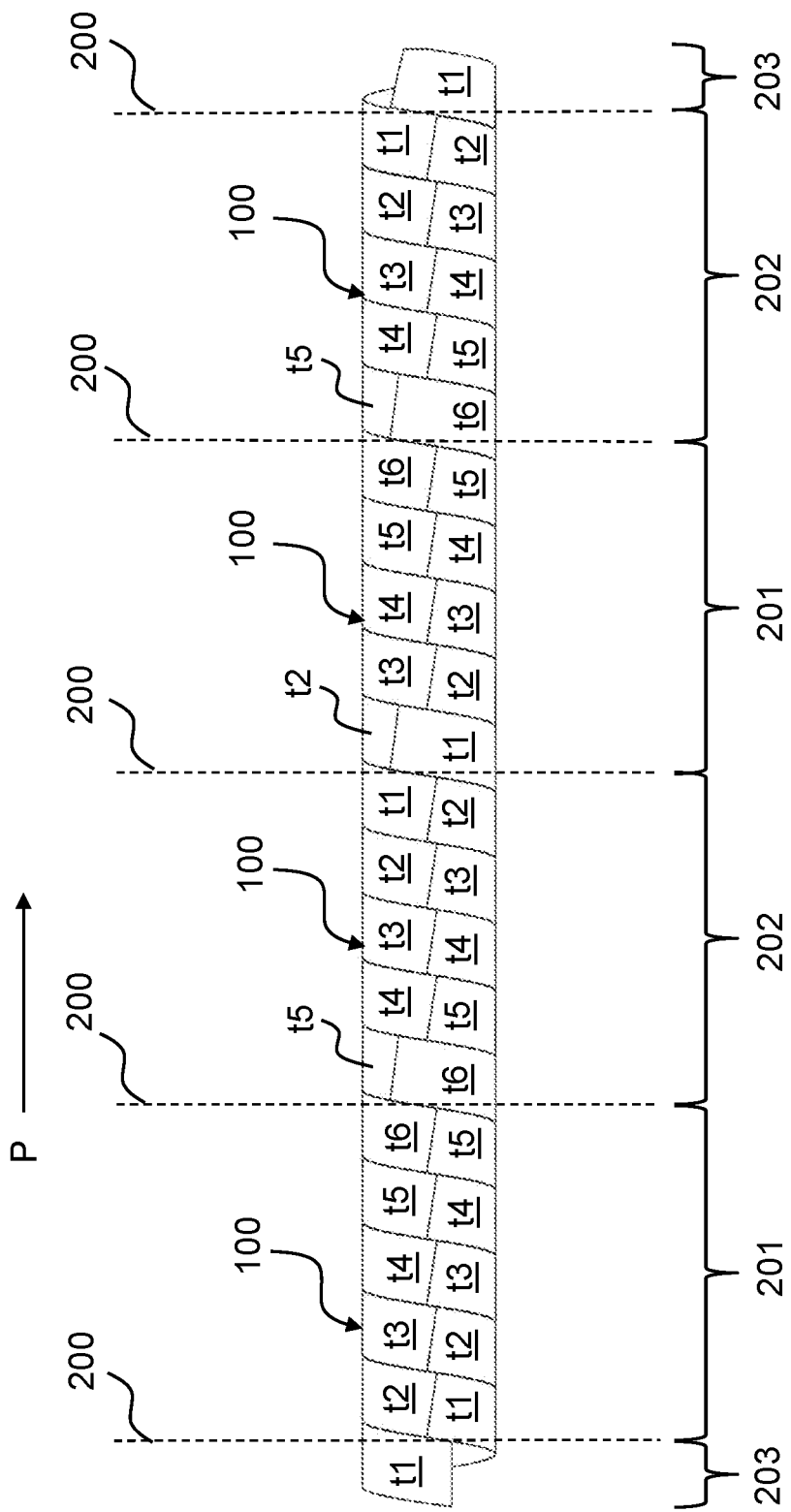
FIG. 2 is a schematic representation of a production order for forming the cylindrical tube of FIG. 1 in a continuous production process.

Referring now to FIG. 2, a production order "P" represents formation of multiple instances of the cylinder 100 in sequence over time (represented by the direction of the arrow of the production order "P") as the sheets t1, t2, t3, t4, t5, t6 are moved through a fabrication system in series. In FIG. 2, for the sake of explanation, the multiple instances of the cylinder 100 produced in the production order "P" are shown as a continuous cylinder, such as would be formed by a fabrication system if the multiple instances of the cylinder 100 were not separated from one another during the course of a fabrication process. As described in greater detail below, however, each instance of the cylinder 100 may be severed at a separation plane 200 to separate the instance of the cylinder 100 from the next instance of the cylinder 100 (e.g., as the next instance of the cylinder 100 is being formed) or to separate the instance of the cylinder 100 from scrap 203 at the beginning and end of the production order.

In general, the production order "P" may be based on arranging the variations in thickness of the multiple instances of the cylinder 100 relative to one another in a manner that produces little or no scrap during transitions in the formation of each instance of the cylinder 100. For example, in the production order "P," the sheets t1, t2, t3, t4, t5, t6 may be arranged to form an alternating pattern having a first discrete section 201 and a second discrete section 202 separated by the separation plane 200. Thickness of the material of the first discrete section 201 may match thickness of the material of the second discrete section 202 at the separation plane 200, and thickness of each of the first discrete section 201 and the second discrete section 202 may vary in a direction away from the separation plane. For example, the variation of the thickness of the first discrete section 201 in a direction away from the separation plane 200 may have mirror symmetry with the variation of the thickness of the second discrete section 202 in a direction away from the separation plane 200. As should be generally understood, such symmetry may be particularly useful for forming substantially identical instances of the cylinder 100. However, as described in greater detail below, other variations in thickness of the first discrete section 201 with respect to variations in thickness of the second discrete section 202 are additionally or alternatively possible. To ensure that thickness of the first discrete section 201 substantially matches the thickness of the second discrete section 202 at the separation plane 200, the separation plane 200 may be positioned to extend through (e.g., to bisect) a single one of the sheets t1, t2, t3, t4, t5, t6 having a substantially uniform thickness.

According to the production order "P," the first discrete section 201 may be formed into a first instance of the cylinder 100 and severed from the second discrete section 202 along the separation plane 200 as the second discrete section 202 is moved through a fabrication system to form a second instance of the cylinder 100. Similarly, the second discrete section may be formed into the second instance of the cylinder 100 and severed from a next instance of the first discrete section 201 along the separation plane 200 as the next instance of the first discrete section 201 is moved through a fabrication system. In general, this alternating process may be repeated as necessary to form multiple instances of the cylinder 100.

At each transition between instances of the cylinder 100, the first discrete section 201 and the second discrete section 202 may match one another at the separation plane 200 according three criteria useful for reducing or eliminating scrap associated with transitions between instances of the cylinder 100: 1) the first discrete section 201 and the second discrete section 202 may have matching taper at the separation plane 200; 2) the first discrete section 201 and the second discrete section 202 may have the same radius of curvature at the separation plane 200; and 3) the sheets t1, t2, t3, t4, t5, t6 may be arranged such that a thickness of the first discrete section 201 matches a thickness of the second discrete section 202 along the separation plane 200. The first two criteria are, in general, an artifact associated with forming multiple instances of the cylinder 100, with each instance being substantially similar to each other instance. The third criterion is facilitated by the production order "P."

In certain implementations, the production order "P" for forming multiple instances of the cylinder 100 may be carried out continuously. That is, because scrap is not produced between formation of instances of the cylinder 100, it is unnecessary to stop the production process to remove scrap between instances of the cylinder 100. Rather, scrap 203 is produced at the beginning and at the end of the production order "P," when the impact of the scrap production on continuity of the production order "P" is not significant. Accordingly, as compared to a production order requiring periodic removal of scrap, the production order "P" may be useful for improving throughput of fabrication of the cylinder 100 and for reducing labor requirements.

Figure 3:
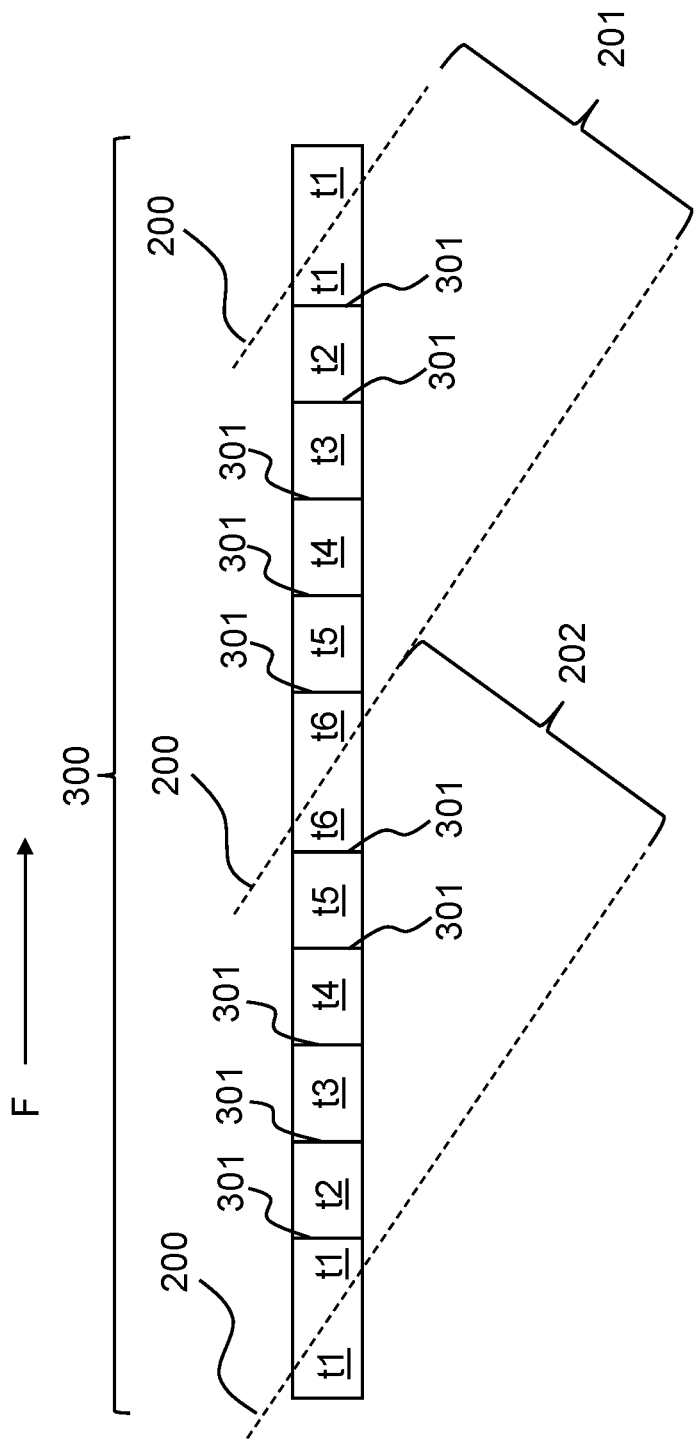
FIG. 3 is a top view of sheets of a material arranged in a sequence based on the production order of FIG. 2.

Referring now to FIGS. 2 and 3, the production order "P" may form a basis for ordering the planar forms of the sheets t1, t2, t3, t4, t5, t6 for feeding into a fabrication system. That is, conceptually, the continuous cylinder representing the production order "P" of multiple instances of the cylinder 100 may be unwrapped to provide an ordering for arranging the sheets t1, t2, t3, t4, t5, t6 as a material 300 to be moved in a feed direction "F" into a fabrication system. As described in greater detail below, in the fabrication system, the material 300 formed by the sheets t1, t2, t3, t4, t5, t6 may be curved and joined to form instances of the cylinder 100, and each instance of the cylinder 100 may be severed along a respective instance of the separation plane 200.

In general, the sheets t1, t2, t3, t4, t5, t6 may be formed of any one or more materials suitable for withstanding load associated with a particular application and formable into the cylinder (100) according to any one or more of the methods described herein. For the sake of clear explanation, unless otherwise specified or made clear from the context, it should be generally understood that the sheets t1, t2, t3, t4, t5 t6 are formed of the same base material such that any differences in structural performance of the sheets t1, t2, t3, t4, t5, t6 in a given instance of the cylinder 100 (FIG. 1) may be attributable to structural characteristics of the sheets t1, t2, t3, t4, t5, t6. In particular, differences in structural characteristics of the sheets t1, t2, t3, t4, t5, t6 should be generally understood as being attributable to differences in thicknesses of the sheets t1, t2, t3, t4, t5, t6. It should be more generally understood, however, that the sheets t1, t2, t3, t4, t5, t6 may have different material compositions in some implementations.

The material 300 may be formed from the sheets t1, t2, t3, t4, t5, t6 by, for example, joining the sheets t1, t2, t3, t4, t5, t6 in an end-to-end abutting relationship along cross-seams 301. The cross-seams 301 may be formed according to any one or more of various different joining techniques suitable for the base material of the sheets t1, t2, t3, t4, t5, t6. For example, the sheets t1, t2, t3, t4, t5, t6 may each be each formed of steel (or another similar metal suitable for withstanding loads associated with industrial applications and bendable to form the cylinder) and the cross-seams 301 may be formed according to any one or more of the welding techniques described herein.

In certain implementations, the separation planes 200 may be positioned relative to the cross-seams 301 such that the separation planes 200 are spaced apart from the cross-seams 301. Such spacing may be useful, for example, for reducing the likelihood of severing the material 300 along corner seams (such as a corner seam 501 in FIG. 5) formed at the intersection of the cross-seams 301 and a spiral along which the material 300 is curved to form the cylinder 100. Severing the material 300 at or near the corner seams may create a geometry at which many seams come together at once (e.g., the corner seam plus a seam joining the flange at the cut) and/or a geometry with fatigue properties that are not fully represented in design codes.

As an example of spacing that may be useful for reducing the likelihood of severing corner seams in the cylinder 100, the sheets t1, t2, t3, t4, t5, t6 may be collectively dimensioned such that each of the separation planes 200 extends through a longer sheet that may be joined to itself over a longer distance. As shown in FIG. 3, for example, t1 and t6 may be longer than the other sheets such that the separation planes 200 extending through those sheets may be suitably spaced apart from the respective cross-seams 301 and, thus, spaced apart from the corner seams formed by the cross-seams 301.

The geometric criteria for the longer sheet is that its length must be greater than:

$$L \geq \sqrt{(\pi D)^2 + s'2}$$

where L is the length of sheet, D is the diameter of the cylindrical section, and s is the width of the sheet.

Figure 4:
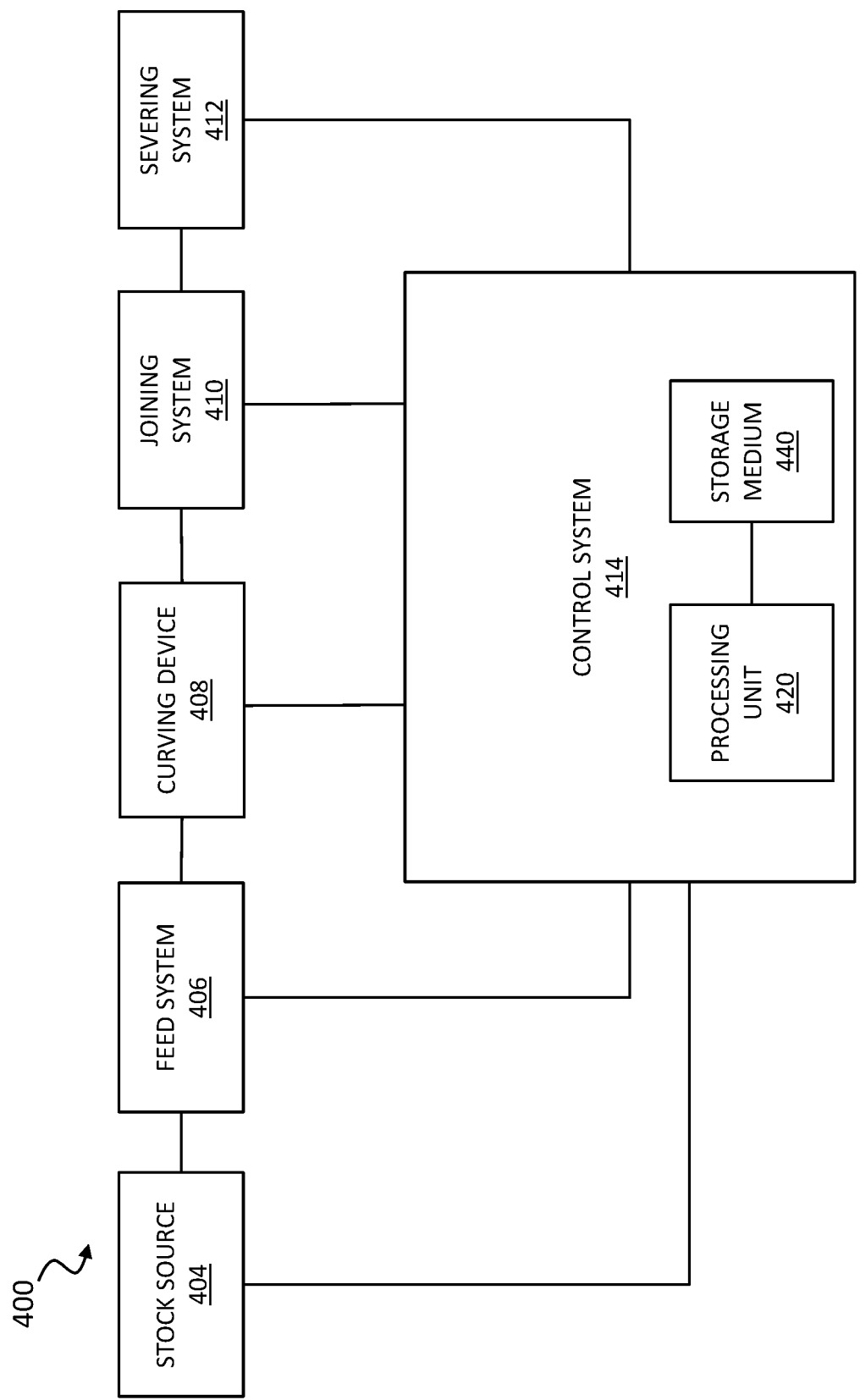
FIG. 4 is a block diagram of a fabrication system.
Figure 5:
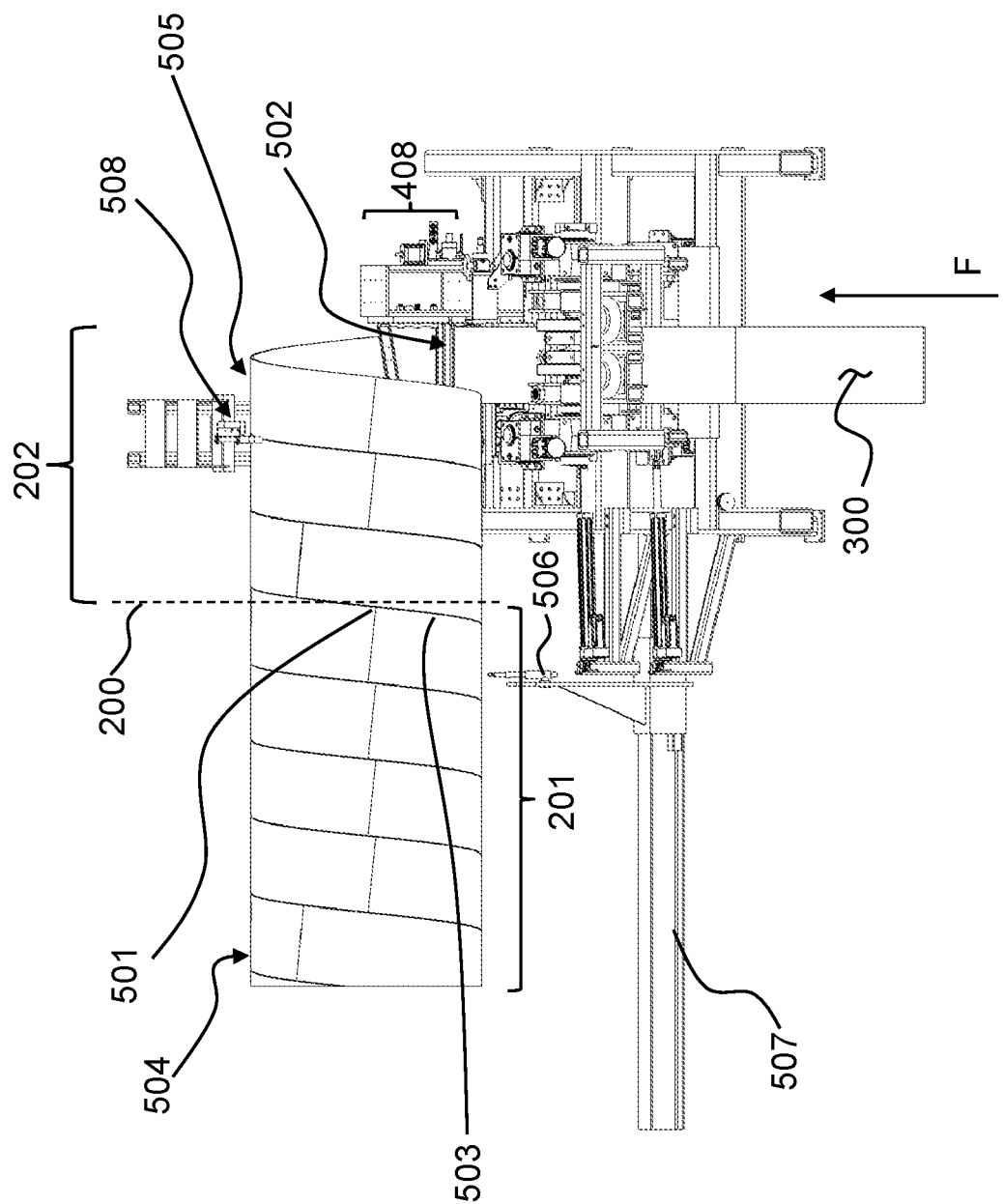
FIG. 5 is a schematic representation of a spiral forming process carried out by the fabrication system of FIG. 5 on the sheets of material in FIG. 3 to form the cylindrical tube of FIG. 1 in a continuous production process.

Referring now to FIGS. 3-5, a fabrication system 400 may include a stock source 404, a feed system 406, a curving device 408, a joining system 410, a severing system 412, and a control system 414. As described in greater detail below, the fabrication system 400 may be operable to fabricate multiple instances of the cylinder 100 (FIG. 1) according to the methods described herein. The control system 414 may control each of the stock source 404, the feed system 406, the curving device 408, the joining system 410, and the severing system 412. In some implementations, the control system 414 may control more or fewer components of the fabrication system 400, and any combinations thereof. For example, the control system 414 may additionally control a runout system to move instances of the cylinder 100 in a direction away from the curving device 408 and/or the joining system 410.

The control system 414 may include a processing unit 420 and a storage medium 440 in communication with the processing unit 420. The processing unit 420 may include one or more processors, and the storage medium 440 may store computer-executable instructions that, when executed by the processing unit 420, cause the fabrication system 400 to perform one or more of the tube forming methods described herein. Optionally, the control system 414 may include an input device (e.g., a keyboard, a mouse, and/or a graphical user interface) in communication with the processing unit 420 and the storage medium 440 such that the processing unit 420 is additionally, or alternatively, responsive to input received through the input device as the processing unit 420 executes one or more of the tube forming methods described herein.

More generally, the control system 414 may include any processing circuitry configured to control operation of the fabrication system 400. This may, for example, include dedicated circuitry configured to execute processing logic as desired or required, or this may include a microcontroller, a proportional-integral-derivative controller, or any other programmable process controller. This may also or instead include a general-purpose microprocessor, memory, and related processing circuitry configured by computer executable code to perform the various control steps and operations contemplated herein.

More generally, the controller 28 may include any processing circuitry configured to receive sensor signals and responsively control operation of the fabrication system 20. This can, for example, include dedicated circuitry operable to execute processing logic as desired or required, or this can include a microcontroller, a proportional-integral-derivative controller, or any other programmable processor controller.

The stock source 404 may include the sheets t1, t2, t3, t4, t5, t6, which may be stored in a magazine or other suitable dispenser to facilitate selection and loading of the sheets t1, t2, t3, t4, t5, t6 during manufacturing.

Between the stock source 404 and the feed system 406, the sheets t1, t2, t3, t4, t5, t6 may be joined (e.g., welded) to one another at the cross-seams 301 to form the material 300. In general, the cross-seams 301 may be oblique to the feed direction "F" along which the material 300 is moved into the curving device 408. More specifically, the cross-seams 301 may be perpendicular to the feed direction "F" along which the material 300 is moved into the curving device 408.

The feed system 406 may be operable to transport the material 300 from the stock source 404 to and/or through the curving device 408. The feed system 406 may include, for example, one or more pairs of drive rolls pinching the material 300 such that rotation of the drive rolls can move the material 300 in the feed direction "F." More generally, any equipment suitable for moving planar material according to any of various different techniques known in the art may be used to move the planar form of the material 300 from the stock source 404 to, and in in some instances through, the curving device 408. Such equipment may include, for example, robotic arms, pistons, servo motors, screws, actuators, rollers, drivers, electromagnets, or combinations thereof. In certain implementations, the feed direction "F" may be substantially constant (e.g., with the one or more pairs of drive rolls of the feed system 406 in a substantially stationary position as the one or more pairs of drive rolls move the material 300 to and through the curving device 408).

The curving device 408 may impart a controllable degree of curvature to the material 300 fed into it. The curving device 408 may include, for example, a roll bender 502 including roll banks positioned relative to one another and to the material 300 to impart curvature to the material 300 fed through the roll bender 502. In certain instances, the roll banks of the roll bender 502 may be arranged as a triple-roll and, further or instead, the roll banks may be movable relative to one another to vary a bending moment applied to the material 300 moving through the roll bender 502. Such a variation in the bending moment may be useful, for example, for bending the sheets of variable thickness (e.g., the sheets t1, t2, t3, t4, t5, t6) to the same diameter to form the cylinder 100 (FIG. 1).

In general, the curving device 408 may impart a bending moment to a planar form of the material 300. More specifically, the curving device 408 may impart a bending moment to the material 300 along the first discrete section 201 and the second discrete section 202 as the material 300 moves through the curving device 408. Thus, for example, as a portion of the material 300 intersected by the separation plane 200 moves through the curving device 408, the material 300 may be formed into a first cylinder 504 having a spiral seam 503 intersected by the separation plane 200. As a more specific example, the curving device 408 may form the material 300 having the spiral seam 503 by bending the material 300 such that a first edge of the first discrete section 201 is adjacent to a second edge of the second discrete section 202 at the intersection of the separation plane 200 and the spiral seam 503. Through processing (e.g., joining and severing) described in greater detail below, the first cylinder 504 may be formed into an instance of the cylinder 100 (FIG. 1).

The joining system 410 may mechanically couple the material 300 to itself along the spiral seam 503. For example, the first discrete section 201 and the second discrete section 202 may be oriented relative to one another such that the joining system 410 may join the first discrete section 201 to itself and to the second discrete section 202 along the spiral seam 503 (e.g., at the intersection of the separation plane 200 and the spiral seam 503). Continuing with this example, with the first discrete section 201 joined to itself and to the second discrete section 202 (at least at the intersection of the separation plane 200 and the spiral seam 503), the first discrete section 201 and the second discrete section 202 may have sufficient mechanical strength along the separation plane 200 to withstand a severing process, described in greater detail below, for separating the first cylinder 504 from the second discrete portion 202 as the second discrete section 202 moves through the curving device 408.

The joining system 410 may include, for example, one or more weld heads 508 suitable for welding the material 300 to itself along the spiral seam 503 as the material 300 moves through the curving device 408. In general, the one or more weld heads 508 may be positioned to weld the material 300 along an inside surface and/or along an outside surface of the material 300 in a curved state to hold the material 300 together along the spiral seam 503. A variety of techniques for welding are known in the art and may be adapted for joining the sheets t1, t2, t3, t4, t5, t6 together to form the material 300 and for joining one or more edges of the material together as contemplated herein. This can, for example, include any welding technique that melts a base metal or other material along the spiral seam 503, optionally along with a filler material adapted to the joint to improve the strength of the bond. Conventional welding techniques suitable for structurally joining metal include, by way of example and not limitation: gas metal arc welding (GMAW), including metal inert gas (MIG) and/or metal active gas (MAG); submerged arc welding (SAW); laser welding; and gas tungsten arc welding (also known as tungsten, inert gas or "TIG" welding); and many others. These and any other techniques suitable for forming a structural bond between edges of the material 300 may be adapted for the joining system 410 and, more generally, for any manner and form of joining described herein. The mechanical coupling imparted by the joining system 410 may be, for example, continuous along the spiral seam 503 to provide enhanced structural strength to the first cylinder 504 and, ultimately, to instances of the cylinder 100 (FIG. 1). The mechanical coupling may also or instead include intermittent coupling (e.g., at fixed distances) along the spiral seam 503 to facilitate, for example, faster throughput for applications in which structural strength of the cylinder 100 (FIG. 1) is not a key design consideration.

The severing system 412 may, in general, mechanically separate the first discrete section 201 and the second discrete section 202 from one another along the separation plane 200 to form instances of the cylinder 100 (FIG. 1). Specifically, with reference to the example shown in FIG. 5, the severing system 412 may separate the first discrete section 201 (in the form of the first cylinder 504) from the second discrete section 202 as the second discrete section 202 is moving through the curving device 408 and being formed into a second cylinder 505. In certain implementations, the severing system 412 may achieve such separation with little or no deformation of the first discrete section 201 and the second discrete section 202.

The severing system 412 may include, for example, a cutting head 506 and a track 507. The cutting head 506 may be, for example, any of various different known torch cutting methods known in the art as being useful for cutting metal and, in particular, steel. Thus, for example, the cutting head 506 may be a plasma cutting torch and/or an oxy/acetylene flame cutting torch. Additionally, or alternatively, the cutting head 506 may include a mechanical separation device, such as a metal-cutting saw.

The cutting head 506 may travel on the track 507 for appropriate positioning. For the sake of clarity of illustration, the cutting head 506 in FIG. 5 is shown in an inactive state, away from the separation plane 200. In use, the cutting head 506 may be moved along the track 507 to maintain alignment with the separation plane 200 as the material 300 moves through the curving device as the second cylinder 505 continues to be formed from the second discrete section 202 of the material 300. With the cutting head 506 aligned with the separation plane 200, the cutting head 506 may cut the material 300 along the separation plane 200 as the first discrete section 201 and the second discrete section 202 rotate past the cutting head 506. As discussed above, the separation plane 200 may be advantageously spaced apart from the corner seam 501 such that, accordingly, a cut made by the cutting head 506 is also spaced apart from the corner seam 501.

Figure 6:
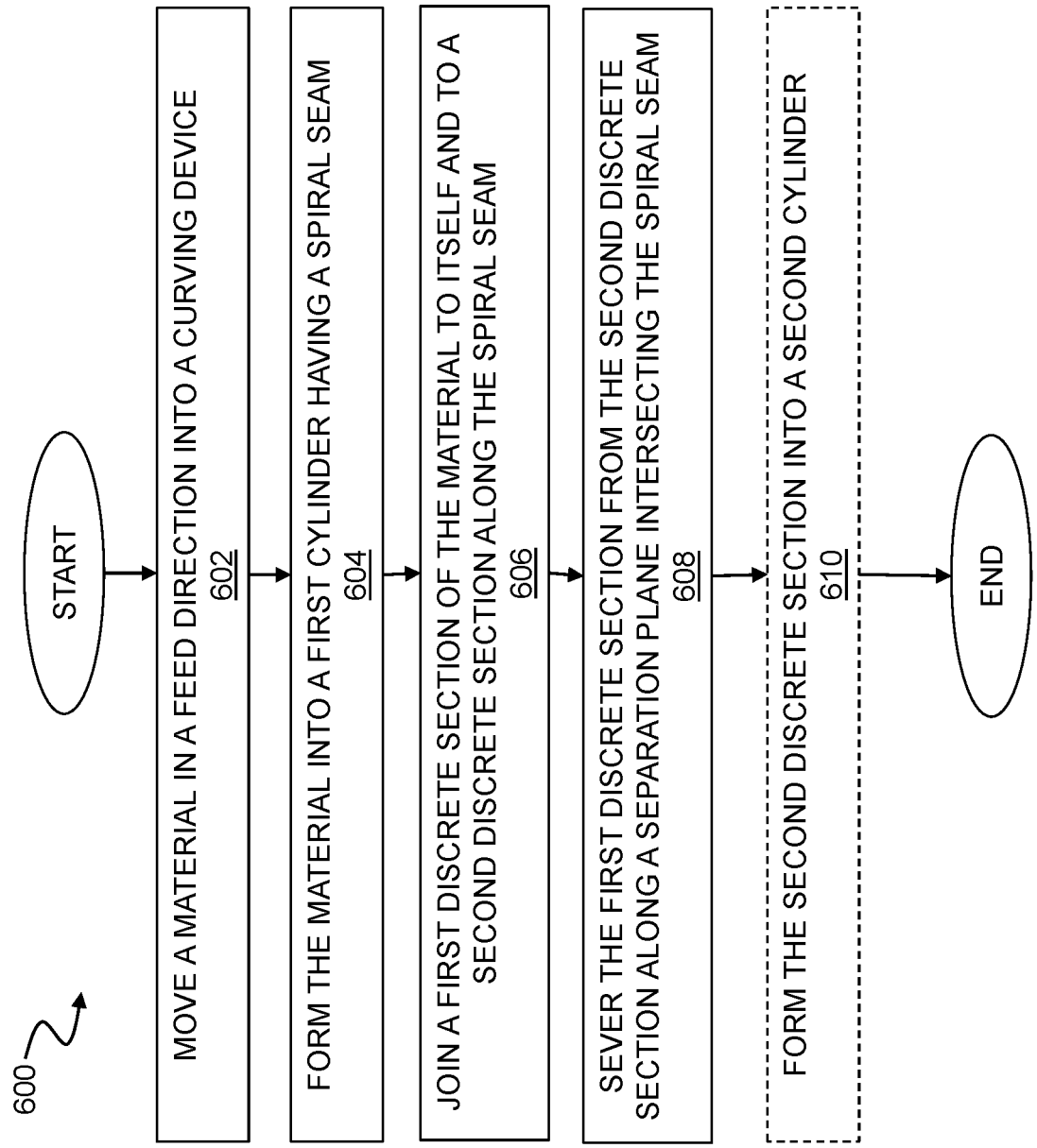
FIG. 6 is a flowchart of an exemplary method of forming a tube.

Referring now to FIG. 6, a flowchart of an exemplary method 600 of forming a tube is shown. It should be appreciated that the exemplary method 600 may be carried out, for example, by any one or more of the fabrication systems described herein to form any one or more of the structures described herein. For example, one or more of the steps of the exemplary method 600 may be carried out by a processing unit of a control system (e.g., the processing unit 420 of the control system 414 in FIG. 4).

As shown in step 602, the exemplary method 600 may include moving a material in a feed direction into a curving device. For example, the material may be moved substantially continuously in the feed direction, which may be useful for achieving higher throughput than otherwise achievable through a process requiring periodic interruption in the supply of material. As used herein, substantially continuous movement of the material shall be understood to include movement of the material at a rate that may fluctuate (e.g., according to normal variations in the movement of material using drive rolls or other similar feeding systems) but may remain nonzero throughout the process of forming the tube.

The material moved through the curving device may be any one or more of the materials described herein. Thus, for example, the material may be the material 300 (FIG. 3). Accordingly, the material moved into the curving device may be a planar strip of material—more specifically, a planar strip of metal (e.g., steel)—that is curved into one or more cylinders as the material moves through the curving device.

In general, the material moved into the curving device may have a first discrete section abutting a second discrete section along a separation plane intersecting the material. Continuing with this example, the first discrete section and the second discrete section may have the same thickness at the separation plane and each may have a varying thickness in the feed direction. The respective variations in thickness of the first discrete section and the second discrete section in respective directions away from the separation plane may include step-wise changes in thickness (such as may be achievable with step-wise changes in material thickness of substantially uniform sheets coupled to one another to form the material). Further or instead, the respective variations in thickness of the first discrete section and the second discrete section in respective directions away from the separation plane may include substantially continuous changes (e.g., achieved through machining) in thickness along at least a portion of each section.

The variations in thickness of the first discrete section and the second discrete section in the respective directions away from the separation plane may have any one or more of various different profiles suitable for forming cylinders according to a production order producing little or no scrap in transitions between the cylinders being formed. For example, a variation in thickness of the first discrete section may be symmetrically mirrored about the separation plane by a variation in the thickness of the second discrete section. Further, or instead, at least a portion of the first discrete section may have a monotonically changing thickness along the feed direction, and at least a portion of the second discrete section may have a monotonically changing thickness along the feed direction. For example, the thickness of one of the at least one portion of the first discrete section and at the at least one portion of the second discrete section may increase in the feed direction. In such instances, the thickness of the other one of the at least one portion of the first discrete section and the at least one portion of the second discrete section may decrease in the feed direction.

In certain implementations, the material may include a plurality of sheets secured to one another in a direction intersecting the feed direction of the material into the curving device (e.g., along cross-seams, such as the cross-seams 301 described above with respect to FIG. 3). Along the first discrete section of the material, at least one of the sheets may have a different thickness than at least one other sheet, thus forming the variation in thickness of the first discrete section. The variation in thickness of the second discrete section may be similarly defined by variations in thickness of the sheets forming the second discrete section. The separation plane may advantageously intersect only a single sheet of the plurality of sheets such that thickness of the first discrete section matches thickness of the second discrete section along the separation plane. In certain instances, the separation plane may bisect the single sheet of the plurality of sheets. Further, or instead, the intersected sheet (or, in some cases, the substantially bisected sheet) may be longer than at least one adjacent sheet in the plurality of sheets. Such an increase in length may also or instead be useful for reducing the likelihood of severing along or near the cross seams.

As shown in step 604, the exemplary method 600 may include, as the material intersected by the separation plane moves through the curving device, forming the material into a first cylinder having a spiral seam intersected by the separation plane. In general, the formation of the material into the first cylinder includes bending the material according to any one or more of the curving techniques described herein and, thus, may include moving the material through a triple roll arranged to curve the material. Further, or instead, moving the material through the curving device may include bending a first longitudinal edge of the material adjacent to a second longitudinal edge of the material, with the resulting adjacent edges forming the spiral seam. More specifically, forming the material into the first cylinder may include bending a first edge of the first discrete section adjacent to a second edge of the second discrete section at the intersection of the separation plane and the spiral seam. That is, the separation plane separating the first discrete portion from the second discrete portion may intersect the spiral seam. Further, or instead, the separation plane may be perpendicular to a longitudinal axis defined by the first cylinder being formed. Such a perpendicular orientation may produce an end cut substantially perpendicular to the longitudinal axis defined by the first cylinder, such as may be required in the final application (e.g., a wind tower may require an end cut perpendicular to the longitudinal axis of the cylinder to facilitate vertical orientation of the cylinder in the final application). Such a perpendicular orientation may be advantageous for facilitating severing the first cylinder from the remainder of the material (e.g., rotation of the curved material about the longitudinal axis of the cylinder and relative to a cutting head may be incorporated into a severing process as described herein).

As shown in step 606, the exemplary method 600 may include joining the first discrete section to itself and to the second discrete section along the spiral seam. As part of a continuous process of forming the tubes, such joining may include continuously joining material along the spiral. More generally, joining the first discrete section to itself and to the second discrete section along the spiral seam may be carried out according to any one or more of the joining methods described herein and, thus, may include welding (e.g., continuously welding) the material in instances in which the material is suitable for welding. Further, or instead, in implementations in which the material is formed by joining sheets together along cross-seams, joining the first discrete section to itself and to the second discrete state may include forming corner seams of the material along the spiral seam. Continuing with this example, it may be desirable to position the separation plane such that the intersection of the separation plane and the spiral is spaced apart from the corner seams to reduce the likelihood that severing along the separation plane will result in the formation of undesirable fatigue locations along one or more of the tubes being formed.

As shown in step 608, the exemplary method 600 may include severing the first discrete section (formed as the first cylinder) from the second discrete section along the separation plane intersecting the spiral seam along a position at which the first discrete section is joined to the second discrete section. More specifically, the first discrete section may be severed from the second discrete section as a segment of the second discrete section is in the curving device. That is, given that the first discrete section corresponds to the first cylinder at the time of severing, the first cylinder may be severed from the second discrete section as the segment of the second discrete section is in the curving device, which may be particularly useful for continuously forming cylinders according to the exemplary method 600.

Such severing may be achieved according to any one or more of the severing techniques described herein and, in general, may include cutting the material along an entire circumference of the first cylinder to separate the first cylinder from a second cylinder being formed as the second discrete section moves through the curving device. That is, the separation plane may bound a trailing edge of the first cylinder and a leading edge of the second cylinder and, accordingly, severing along the separation plane may form the trailing edge of the first cylinder and the leading edge of the second cylinder. Thus, to facilitate achieving suitable dimensional tolerance in the formation of the first cylinder and the second cylinder, each of the first cylinder and the portion of the second cylinder formed at the time of severing may remain undeformed as the first discrete section is severed from the second discrete section.

As shown in step 610, the exemplary method 600 may, optionally, include forming the second discrete section into the second cylinder. As should be generally understood, the steps for forming the second cylinder may be identical or at least substantially similar to the steps associated with forming the first discrete section into the first cylinder. Likewise, the second cylinder may be joined and severed in steps analogous to those described above with respect to the first cylinder. More generally, the steps of the exemplary method 600 may be repeated as necessary to form a plurality of cylinders associated with a production order. Thus, for example, the steps of the exemplary method 600 may be repeated as necessary to form a third cylinder, a fourth cylinder, a fifth cylinder, etc.

While certain embodiments have been described, other embodiments are additionally or alternatively possible.

For example, while the special case of producing substantially identical instances of a cylinder has been described, it should be appreciated the methods of the present disclosure may be carried out more generally to produce cylinders of different sizes. That is, the permissible combination of sizes that may be formed according to the methods disclosed herein are generally governed by the three criteria described above with respect the production order "P" shown in FIG. 2. Namely, the devices and systems of the present disclosure may carry out any one or more of the methods described herein to form any combination of cylinder sizes provided that the following criteria are met at each separation plane delineating adjacent cylinders in a production order: 1) each cylinder has a matching taper at the separation plane; 2) each cylinder has the same radius of curvature at the separation plane; and 3) each cylinder has a matching thickness at the separation plane. The first criterion should be generally understood to be met by the fabrication of cylinders. Thus, the second and third criteria may generally govern a permissible production order of cylinders of varying sizes.

Figure 7:
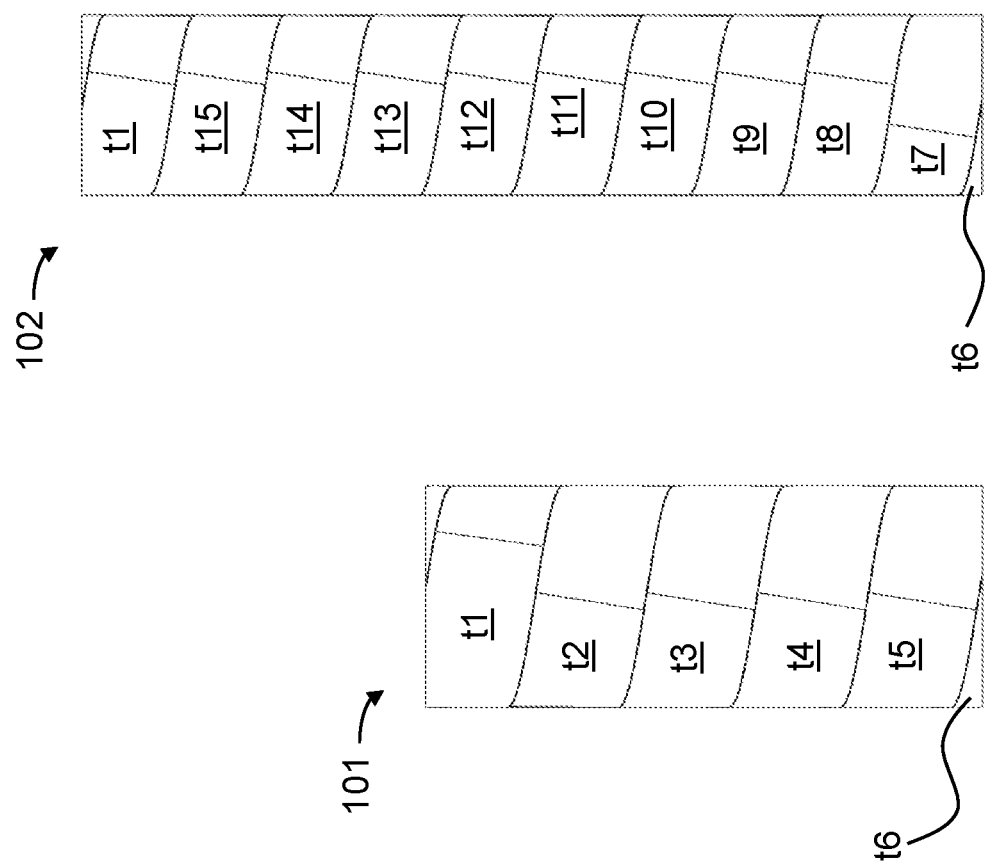
FIG. 7 is a side view of cylindrical tubes of varying dimensions, with each cylindrical tube having a respective longitudinal variation in thickness.
Figure 8:
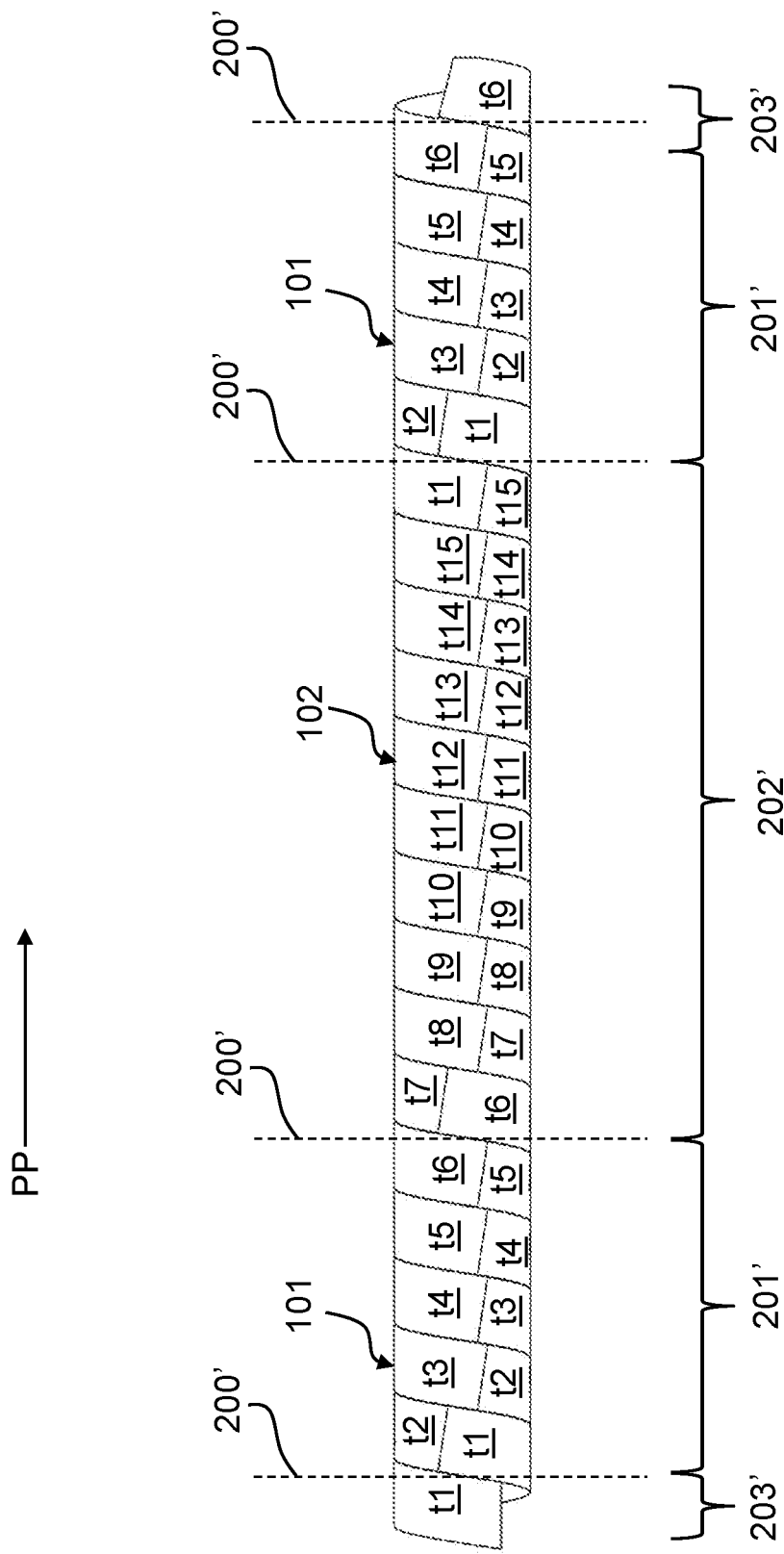
FIG. 8 is a schematic representation of a production order for forming the cylindrical tubes of FIG. 7 in a continuous production process.

Referring now to FIGS. 7 and 8, cylinders 101 and 102 are cylinders of varying size that may be formed according to the production order "PP". Elements in FIG. 8 denoted with primed (') element numbers should be understood to be substantially analogous to corresponding elements with unprimed numbers in FIG. 2. Thus, for the sake of efficient and clear description, these primed element numbers are not described again, except to highlight any differences with respect to corresponding unprimed elements in FIG. 2. Accordingly, unless otherwise specified or made clear from the context, a separation plane 200' in FIG. 8 should be understood to be analogous to the separation plane 200 in FIG. 2, unless otherwise specified or made clear from the context.

In general, the cylinders 101 and 102 may be formed from a plurality of sheets. In particular, the cylinder 101 may be formed from sheets t1, t2, t3, t4, t5, t6 and, thus, may be understood to be substantially similar to the cylinder 100 (FIG. 1), unless otherwise specified or made clear from the context. The cylinder 102 may be longer than the cylinder 101 and may be formed of sheets t6, t7, t8, t9, t10, t11, t12, t13, t14, t15. Further, or instead, the thickness profile of the cylinder 101 may differ from a thickness profile of the cylinder 102, provided that the thickness profiles along the first discrete section 201' and the second discrete section 202' match at the separation planes 200'. The cylinders 101 and 102 may be formed in a substantially continuous process in which the sheets t1, t2, t3, . . . t15 are fed into a fabrication system (e.g., the fabrication system 400 in FIG. 4) according to an order based on the production order PP.

The above systems, devices, methods, processes, and the like may be realized in hardware, software, or any combination of these suitable for the control, data acquisition, and data processing described herein. This includes realization in one or more microprocessors, microcontrollers, embedded microcontrollers, programmable digital signal processors or other programmable devices or processing circuitry, along with internal and/or external memory. This may also, or instead, include one or more application specific integrated circuits, programmable gate arrays, programmable array logic components, or any other device or devices that may be configured to process electronic signals. It will further be appreciated that a realization of the processes or devices described above may include computer-executable code created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software. At the same time, processing may be distributed across devices such as the various systems described above, or all of the functionality may be integrated into a dedicated, standalone device. All such permutations and combinations are intended to fall within the scope of the present disclosure.

Embodiments disclosed herein may include computer program products comprising computer-executable code or computer-usable code that, when executing on one or more computing devices, performs any and/or all of the steps of the control systems described above. The code may be stored in a non-transitory fashion in a computer memory, which may be a memory from which the program executes (such as random access memory associated with a processor), or a storage device such as a disk drive, flash memory or any other optical, electromagnetic, magnetic, infrared or other device or combination of devices. In another aspect, any of the control systems described above may be embodied in any suitable transmission or propagation medium carrying computer-executable code and/or any inputs or outputs from same.

The method steps of the implementations described herein are intended to include any suitable method of causing such method steps to be performed, consistent with the patentability of the following claims, unless a different meaning is expressly provided or otherwise clear from the context. So, for example, performing the step of X includes any suitable method for causing another party such as a remote user, a remote processing resource (e.g., a server or cloud computer) or a machine to perform the step of X. Similarly, performing steps X, Y and Z may include any method of directing or controlling any combination of such other individuals or resources to perform steps X, Y and Z to obtain the benefit of such steps. Thus, method steps of the implementations described herein are intended to include any suitable method of causing one or more other parties or entities to perform the steps, consistent with the patentability of the following claims, unless a different meaning is expressly provided or otherwise clear from the context. Such parties or entities need not be under the direction or control of any other party or entity, and need not be located within a particular jurisdiction.

It will be appreciated that the methods and systems described above are set forth by way of example and not of limitation. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context. Thus, while particular embodiments have been shown and described, it will be apparent to those skilled in the art that various changes and modifications in form and details may be made therein without departing from the spirit and scope of this disclosure and are intended to form a part of the invention as defined by the following claims, which are to be interpreted in the broadest sense allowable by law.

What is claimed is:

1. A system comprising:
   a roll bender configured to curve a material moving in a feed direction into the roll bender;
   at least one weld head operable to weld the material curved by the roll bender;
   a cutting head positioned to cut the material curved by the roll bender; and
   a controller configured to
      receive a thickness profile indicating discrete sections of the material, the discrete sections each having the same thickness at a separation plane and each having a varying thickness in the feed direction,
      actuate the at least one weld head to join the material to itself at a spiral seam along a cylinder formed from the material curved by the roll bender, and
      actuate the cutting head to sever the discrete sections from one another along the separation plane intersecting the spiral seam of the cylinder.

2. The system of claim 1, wherein the at least one weld head is positioned to weld the material along at least along an inside surface of the cylinder.

3. The system of claim 1, wherein the cutting head includes one or more of a plasma cutting torch, an oxy/acetylene flame cutting torch, or a saw.

4. The system of claim 1, wherein the separation plane intersecting the spiral seam of the cylinder is perpendicular to a longitudinal axis defined by the cylinder.

5. The system of claim 1, wherein actuating the at least one weld head to join the material to itself at the spiral seam includes continuously actuating the at least one weld head to form a continuous weld along the spiral seam.

6. The system of claim 1, wherein the controller is further configured to vary, based on the thickness profile, a bending moment imparted by the roll bender to the material moving through the roll bender.

7. The system of claim 6, wherein variation of the bending moment imparted by the roll bender to the material along the separation plane includes imparting the same radius of curvature to the discrete sections at the separation plane.

8. The system of claim 6, wherein variation of the bending moment imparted by the roll bender to the material moving through the roll bender includes bending the discrete sections of the material to the same diameter to form the cylinder.

9. The system of claim 1, wherein the controller is further configured to maintain the cutting head aligned with the separation plane intersecting the spiral seam as the material moves through the roll bender to form the cylinder and the discrete sections of the material rotate past the cutting head.

10. The system of claim 9, wherein the system further comprises a track along which the cutting head is movable, and maintaining the cutting head along the separation plane intersecting the spiral seam includes moving the cutting head along the track as the material moves through the roll bender to form the cylinder.

11. The system of claim 10, wherein the track is substantially perpendicular to the separation plane.

12. The system of claim 1, further comprising a feed system actuatable to move the material in the feed direction into the roll bender.

13. The system of claim 12, wherein the controller is configured to actuate the feed system to move the material at a substantially constant rate into the roll bender.

14. One or more non-transitory storage media having stored thereon instructions that, when executed by one or more processors, cause the one or more processors to perform operations comprising:
   receiving a thickness profile indicating discrete sections of a material, the discrete sections each having the same thickness at a separation plane and each having a varying thickness in a feed direction;
   moving the material in the feed direction into a roll bender configured to curve the material;
   actuating at least one weld head to join the material to itself at a spiral seam along a cylinder formed from the material curved by the roll bender; and
   actuating a cutting head to sever the discrete sections from one another along the separation plane intersecting the spiral seam of the cylinder.

15. The one or more non-transitory storage media of claim 14, wherein moving the material in the feed direction into the roll bender includes moving the material at a substantially constant rate into the roll bender.

16. The one or more non-transitory storage media of claim 14, wherein actuating the at least one weld head to join the material to itself at the spiral seam includes actuating the at least one weld head to form a continuous weld along the spiral seam.

17. The one or more non-transitory storage media of claim 14, having stored thereon instructions that, when executed by the one or more processors, cause the one or more processors to perform operations further comprising varying, based on the thickness profile, a bending moment imparted by the roll bender to the material moving through the roll bender.

18. The one or more non-transitory storage media of claim 14, having stored thereon instructions that, when executed by the one or more processors, cause the one or more processors to perform operations further comprising maintaining the cutting head aligned with the separation plane intersecting the spiral seam as the material moves through the roll bender to form the cylinder and the discrete sections of the material rotate past the cutting head.

* * * * *